Feb. 26, 1963

M. W. LEE, SR 3,078,783

AROMATIC PRESSURE COOKER

Filed Nov. 21, 1960

MAURICE W. LEE, SR.
*INVENTOR.*

ATTORNEY 3,078,783
AROMATIC PRESSURE COOKER
Maurice W. Lee, Sr., Box 188, Boley, Okla.
Filed Nov. 21, 1960, Ser. No. 70,714
4 Claims. (Cl. 99—259)

This invention relates to pressure cooking vessels, and more particularly to an aromatic pressure cooker that may be heated by a gas flame or the like.

The present invention is a continuation-in-part of an application filed by me in the United States Patent Office on October 21, 1957, Serial Number 691,309, now abandoned.

It is the principal object of this invention to provide a cooker having means for generating steam and smoke, or other aromatic fumes to permeate the food being cooked, which may be heated by a gas flame or other suitable means.

In order to satisfactorily accomplish the desired result it is necessary to heat the generator to a temperature of approximately 750 degrees F. in order to pyrolyze or char the wood placed within the generator to produce smoke therefrom. This temperature would be injurious to a conventional pressure cooker.

Another object of this invention is to provide a means for barbecuing foods using a relatively small amount of heat activatable substances for cooking and smoke flavoring the food.

I have found that one ounce of hickory shavings is sufficient to smoke flavor several pounds of food.

Still another object is to provide a cooker that may be heated by an alcohol flame, bottled gas, or other means such as is commonly used in outdoor cooking.

Another object is to provide a generator unit formed of high heat conductive material for connection with a pressure cooking vessel which will generate the desired heat within the vessel without subjecting the latter to a prohibitive temperature.

The present invention accomplishes these and other objects by connecting a generator or heat transfer device to the bottom of a closed cooking vessel.

Figure 1:
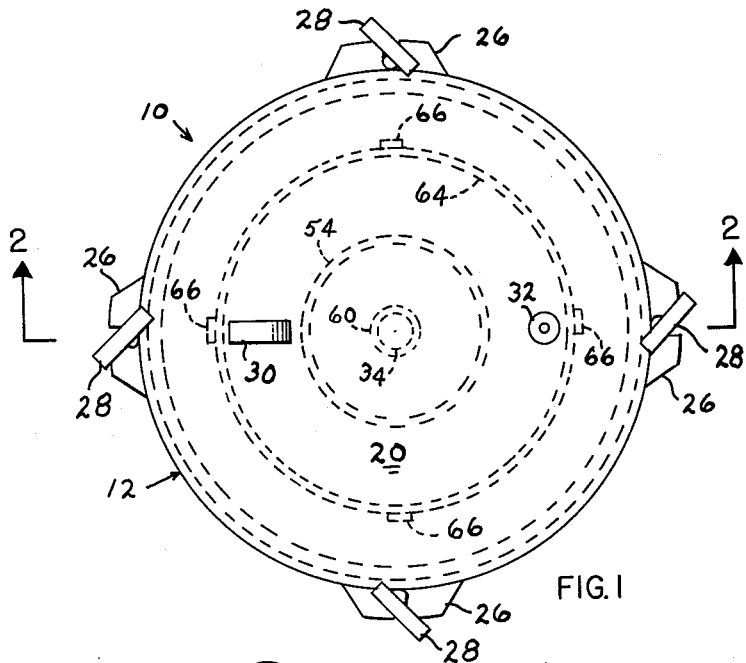
Figure 2:
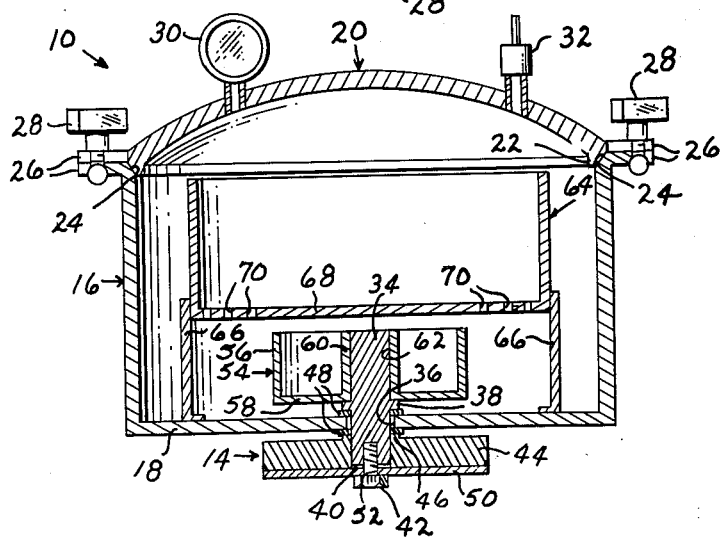

Other objects will be apparent from the following description when taken in conjunction with the accompanying single sheet of drawings, wherein:

FIGURE 1 is a top plan view of the cooker; and
FIGURE 2 is a vertical cross-sectional view taken substantially along the line 2—2 of FIG. 1.

Like characters of reference designate like parts in those figures of the drawings in which they occur.

In the drawings:

The reference numeral 10 indicates the device, as a whole, comprising a container 12 and a generator or heat transfer element 14. The container 12 includes an upwardly open cylindrical vessel or member 16 having a horizontal bottom 18. A lid or cover 20 is provided with a depending flange 22 which is co-operatingly received in a sealing manner with a beveled edge 24 formed on the upwardly disposed peripheral surface of the member 16. The cover 20 and member 16 are each provided with a plurality of outstanding co-operating pairs of lugs or ears 26 which receive bolt means 28 for sealing the cover in place. The cover is provided with a pressure gauge 30 and pop-off or control valve 32.

The heat transfer element 14 includes a central mandrel 34 formed of relatively high heat conductive material, such as aluminum, which is placed within the member 16 and projects downwardly through a suitable central opening 36 formed in the bottom 18. As shown in FIG. 2, the opening 36 is preferably greater diametrically than the diameter of the mandrel 34. The diameter of the mandrel 14 is relatively large when compared with the wall thickness of the container. The mandrel 14 is provided with an annular flange 38, intermediate its ends, for the purposes which will presently be apparent. The mandrel 34 depends a substantial distance below the undersurface of the bottom 18 and this depending end 40 is centrally bored and threaded for receiving a stud bolt 42. A relatively thick disk 44, of similar high heat conductivity, is centrally bored and co-axially received by the depending end portion of the mandrel 34. The disk 44 is provided with an annular flange 46 surrounding the mandrel 34 adjacent the bottom 18 of the container. A pair of heat insulating gaskets 48 are interposed between the upper and lower surfaces of the bottom 18, mandrel flange 38 and disk flange 46, on opposite sides of the bottom. Since the opening 36 is larger than the mandrel 34 the gaskets 48 maintain the mandrel out of direct contact with the container bottom. A relatively thin disk 50, preferably formed of low heat conductive material, such as steel and diametrically substantially equal with respect to the disk 44, is flatly received co-axially by the lowermost surface of the latter in face to face contact. The disk 50 is provided with a central aperture 52 which surrounds the stud bolt 42 whereby the stud bolt may be tightened to impinge the gaskets 48 between opposing surfaces of the flanges 38 and 46 and seal the generator with the container in a vapor or liquid tight manner. Since the principal contact between the generator and the container is through the mandrel flanges 38 and 46 and the gaskets 48 the latter act as insulators in protecting the container from the relatively high heat applied to the generator.

A food flavoring substance receiving receptacle or well 54 is placed within the container. The well 54 is cup-like in general configuration having an outer vertical wall 56 integrally connected with a bottom 58 and an inner wall or boss member 60 which latter is centrally drilled, as at 62, to be closely received by the end portion of the mandrel 34 projecting upwardly into the container. The end portion of the mandrel 34, within the container, is substantially equal to the height of the well. The bottom 58 of the well is maintained in spaced relation with respect to the upper surface of the bottom 18 by the mandrel flange 38.

A food receptacle or rack 64 is supported within the container in spaced relation with respect to the bottom 18 by legs 66. The bottom 68 of the rack is provided with a plurality of circumferential rows of apertures 70 radially spaced outward of the circumference of the well 54 for the purposes more fully explained hereinbelow.

*Operation*

In operation the food receptacle 64 is removed and a limited quantity of water and food flavoring substance, not shown, is placed within the well 54. The rack 64 is replaced and a desired quantity of food stuff is placed therein. The container is sealed and heat, generating a temperature of approximately 750° F., is applied to the disks 44 and 50 of the generator means by a gas burner or the like. The disk 50 prevents melting of the disk 44 by the relatively high temperature. Heat is conducted from the disk 44 to the interior of the container by the mandrel 34 contiguously contacting the wall 60. The water within the well 54 is vaporized thus generating steam to cook the food. Thereafter the food flavoring substance is pyrolized to a charcoal state for imparting a desired smoke flavor to the food stuffs being cooked. During the cooking operation the apertures 70 permit any grease or dripping secreted by the food stuffs to fall to the bottom of the container without contacting the well 54. After using the container in a cooking process the latter is easily cleaned by removing the rack 64 and lifting the well 54 out of the container.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A pressure cooker, including: a closed container having a horizontally disposed bottom, said bottom having a central opening of reduced diameter; a food receiving cylindrical receptacle within said container; legs supporting said receptacle in spaced relation with respect to said bottom, said receptacle being provided with a horizontal bottom, said receptacle bottom having a series of circumferential rows of apertures spaced radially outward of the central opening in the bottom of said container; and smoke and steam generator means connected with said container, said generator means including, a mandrel formed of relatively high heat conducting solid metallic material coaxially received by the opening and spaced from the edge thereof in said container bottom and projecting beyond the upper and lower surfaces of the latter, an annular flange on said mandrel adjacent the upper surface of said bottom, a centrally bored disk formed of relatively high heat conducting and melting point metallic material coaxially secured to the depending end portion of said mandrel, an annular flange on said disk adjacent said bottom maintaining the remaining upper surface of said disk in spaced relation with respect to said container bottom, a heat insulating gasket interposed between the flange on said mandrel and the flange on said disk and the respective upper and lower surfaces of said bottom, a food flavoring receiving well of reduced diameter with respect to said food receiving receptacle, said well formed of relatively high heat conducting metallic material and having an axial centrally bored boss within the well in contiguous contact with the end portion of said mandrel within said container, said mandrel flange supporting said food flavoring receiving well in spaced relation with respect to the upper surface of said bottom, whereby intense heat applied to said disk is conducted to said well through said mandrel without overheating the container bottom.

2. A pressure cooker, including: a closed container having a horizontally disposed bottom, said bottom having a central opening of reduced diameter; a food receiving cylindrical receptacle within said container; legs supporting said receptacle in spaced relation with respect to said bottom, said receptacle having a horizontal bottom, said receptacle bottom having a series of circumferential rows of apertures spaced radially outward of the central opening in the bottom of said container; and smoke and steam generator means connected with said container, said generator means including, a mandrel formed of relatively high heat conducting solid metallic material coaxially received by the opening and spaced from the edge thereof in said container bottom and projecting beyond the upper and lower surfaces of the latter, an annular flange on said mandrel adjacent the upper surface of said bottom, a centrally bored disk formed of relatively high heat conducting and melting point metallic material, of reduced diameter with respect to said container, coaxially secured to the depending end portion of said mandrel, an annular flange on said disk adjacent said bottom maintaining the remaining upper surface of said disk in spaced relation with respect to said container bottom, a heat insulating gasket interposed between the flange on said mandrel and the flange on said disk and the respective upper and lower surfaces of said bottom, a food flavoring receiving well diametrically smaller than said disk, said well formed of relatively high heat conducting metallic material and having a centrally bored boss contiguously contacting the end portion of said mandrel within said container, said mandrel flange supporting said food flavoring receiving well in parallel spaced relation with respect to the upper surface of said bottom, whereby intense heat applied to said disk is conducted to said well through said mandrel without overheating the container bottom.

3. A pressure cooker, including: a closed container having a horizontally disposed bottom, said bottom having a central opening of reduced diameter; and smoke and steam generator means connected with said container, said generator means including, a mandrel formed of relatively high heat conducting solid metallic material coaxially received by the opening and spaced from the edge thereof in said container bottom and projecting beyond the upper and lower surfaces of the latter, an annular flange on said mandrel adjacent the upper surface of said bottom, a centrally bored disk formed of relatively high heat conducting and melting point metallic material, of reduced diameter with respect to said container, coaxially secured to the depending end portion of said mandrel, an annular flange on said disk adjacent said bottom maintaining the remaining upper surface of said disk in spaced relation with respect to said container bottom, a heat insulating gasket interposed between the flange on said mandrel and the flange on said disk and the respective upper and lower surfaces of said bottom, a food flavoring receiving well diametrically smaller than said disk, said well formed of relatively high heat conducting metallic material and having a centrally bored boss contiguously contacting the periphery of the end portion of said mandrel within said container, said mandrel flange supporting said food flavoring receiving well in parallel spaced relation with respect to the upper surface of said bottom, whereby intense heat applied to said disk is conducted to said well through said mandrel without overheating the container bottom.

4. A pressure cooker, including: a closed container having a horizontally disposed bottom, said bottom having a central opening of reduced diameter a food receiving cylindrical receptacle within said container; legs supporting said receptacle in spaced relation with respect to said bottom, said receptacle having a horizontal bottom, said receptacle bottom having a series of circumferential rows of apertures spaced radially outward of the central opening in the bottom of said container; and smoke and steam generator means connected with said container, said generator means including, a mandrel formed of relatively high heat conducting solid metallic material coaxially received by the opening and spaced from the edge thereof in said container bottom and projecting beyond the upper and lower surfaces of the latter, an annular flange on said mandrel adjacent the upper surface of said bottom, a first centrally bored relatively thick disk formed of relatively high heat conducting metallic material, of reduced diameter with respect to said container, coaxially surrounding the depending end portion of said mandrel, an annular flange on said disk adjacent said bottom maintaining the remaining upper surface of said first disk in spaced relation with respect to said container bottom, a heat insulating gasket interposed between the flange on said mandrel and the flange on said first disk and the respective upper and lower surfaces of said bottom, a food flavoring receiving well diametrically smaller than said disk, said well formed of relatively high heat conducting metallic material and having a centrally bored boss contiguously contacting the periphery of the end portion of said mandrel within said container, said mandrel flange supporting said food flavoring receiving well in parallel spaced relation with respect to the upper surface of said bottom, a second relatively thin disk coaxially contacting the lower surface of said first disk, bolt means connecting said first and second disks to said mandrel and impinging said gaskets to seal said mandrel with the bottom of said container, whereby intense heat applied to said disks is conducted to said well through said mandrel without overheating the container bottom.

References Cited in the file of this patent

UNITED STATES PATENTS

| | | |
|---|---|---|
| 167,106 | Line | Aug. 24, 1875 |
| 273,901 | Sherman | Mar. 13, 1883 |
| 1,175,858 | Wojidkow | Mar. 14, 1916 |
| 2,493,903 | Thomas | Jan. 10, 1950 |